United States Patent [19]
Yamakawa et al.

[11] Patent Number: 5,478,105
[45] Date of Patent: Dec. 26, 1995

[54] MODULE COVER FOR AIR BAG DEVICE

[75] Inventors: Kazuhiko Yamakawa; Takayasu Zushi, both of Shiga, Japan

[73] Assignee: Takata Corporation, Tokyo, Japan

[21] Appl. No.: 264,063

[22] Filed: Jun. 22, 1994

[30] Foreign Application Priority Data

Mar. 18, 1994 [JP] Japan .................................. 6-048700

[51] Int. Cl.⁶ .................................................. B60R 21/20
[52] U.S. Cl. .......................................................... 280/728.3
[58] Field of Search .............................. 280/728 B, 731, 280/732, 728 R, 728.3, 728.1

[56] References Cited

U.S. PATENT DOCUMENTS

| | | | |
|---|---|---|---|
| 3,622,176 | 11/1971 | Byer | 280/728 B |
| 4,752,083 | 6/1988 | Honda | 280/731 |
| 5,152,548 | 10/1992 | Zushi | 280/728 B |
| 5,330,223 | 7/1994 | Hiramitsu et al. | 280/728 B |

FOREIGN PATENT DOCUMENTS

| | | | |
|---|---|---|---|
| 0560355A1 | 9/1993 | European Pat. Off. | 280/731 |
| 0241856 | 9/1990 | Japan | 280/728 B |
| 5038996 | 2/1993 | Japan | 280/728 B |
| 5139236 | 6/1993 | Japan | 280/731 |
| 5262194 | 10/1993 | Japan | 280/728 B |
| 2265338 | 9/1993 | United Kingdom | 280/728 B |

*Primary Examiner*—Margaret A. Focarino
*Assistant Examiner*—Peter C. English
*Attorney, Agent, or Firm*—Kanesaka & Takeuchi

[57] ABSTRACT

Adapter members are projected from the inner surface of a cover member and tear lines including a first tear line which extends in the transverse direction of the cover member and second tear lines which extend in the longitudinal direction thereof are provided. The second tear lines are disposed at a short distance away from the adapter members. The thickness of portions of the cover member outside the second tear lines is smaller than that of the adapter members. The thickness of a portion of the cover member between the second tear lines is smaller than that of the portions of the cover member outside the second tear lines. Therefore, the tearing operation proceeding along the first tear line changes the course at the intersecting portions with certainty, and proceeds to the second tear lines. Thus, the module cover is torn open exactly along the tear line.

4 Claims, 13 Drawing Sheets

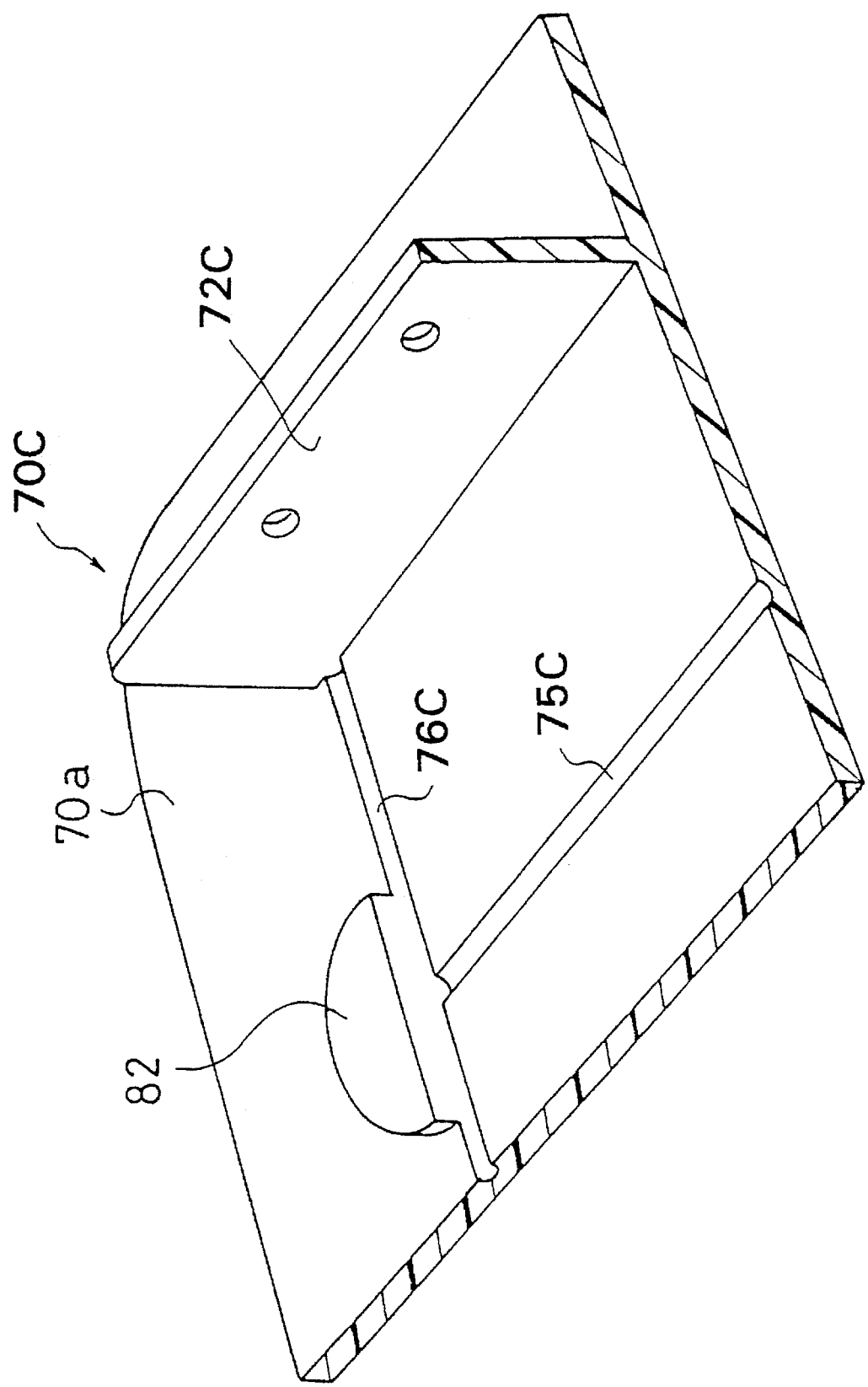

MODULE COVER FOR AIR BAG DEVICE

BACKGROUND OF THE INVENTION

1. Field of the Invention

The present invention relates to a module cover for an air bag device for a driver which is mounted on a steering wheel of an automobile, a module cover for an air bag device for a passenger which is installed in the instrument panel or the like of an automobile, and a module cover for an air bag device for a rear seat occupant. More particularly, the present invention relates to an air bag device improved so that the module cover is torn to open exactly along a tear line provided thereon when the air bag extends.

2. Description of the Related Art

A conventional air bag device for a driver and the module cover thereof will be explained with reference to FIGS. 3 to 6.

As shown in FIG. 3, an air bag device 12 for a driver is provided at the central portion of a steering wheel 10 of a motor vehicle. The air bag device 12 for a driver is composed of an inflator, an air bag attached to an adapter plate which is generally called a retainer, and a module cover 14 provided in such a manner as to cover the inflator, the air bag and the retainer. Engaging portions 18, 20, 22 and 24 which are engaged with spokes 16 are formed on the side surfaces of the module cover 14, as shown in FIGS. 4 and 5.

The module cover 14 is formed of a synthetic resin. The module cover 14 may include a reinforcing material such as a mesh embedded therein. The module cover 14 is provided with tear lines along which the module cover 14 is to be torn open.

The tear lines include a first tear line 28 provided along the center of the module cover 14 in the transverse direction of a vehicle body, i.e. in the widthwise direction of the module cover 14, and second tear lines 30, 32 provided along the side edges of the module cover 14 in the longitudinal direction of the vehicle body, i.e. in the lengthwise direction of the module cover 14. When the "longitudinal" direction or the "transverse" direction of the vehicle body is referred to in this specification, it is assumed that the steering wheel 10 is at the position for a straight forward drive. The second tear lines 30, 32 are provided along and at a short distance away from adapter members 34, 36 for fixing the module cover 14 to the retainer (not shown). The thickness of the module cover 14 at the portions 100, 200 outside the second tear lines 30, 32 is equal to the thickness of the portions 300, 400 between the second tear lines 30, 32. The thickness of the adapter members 34, 36 is also equal to the thickness of these portions 100, 200, 300 and 400.

The tear lines are produced, for example, by forming a continuous groove or aligned hollows along lines where the module cover is to be torn open. In some module covers, the depth of the groove is increased at some portions. In some two-layered module covers consisting of a hard-material layer and a soft-material layer, slits are formed on the hard-material layer along the lines along which the module cover is to be torn open.

At the time of a collision of an automobile with such an air bag device installed therein, the inflator (gas generator) is operated so as to extend the air bag. The module cover 14 is first torn open along the first tear line 28, and the tearing operation propagates to the second tear lines 30, 32. Accordingly, the module cover 14 is largely torn open as indicated by the arrows of two dotted line in FIG. 3, so that the air bag extends largely in a cabin.

FIG. 9 is a perspective view of a conventional air bag device for a passenger or a rear seat occupant seen from the back side thereof, and FIG. 10 is a schematic sectional view of the air bag device shown in FIG. 9 in the operational state.

A module cover 70 is substantially rectangular, and adapter members 71, 72 are attached to the back surface of a plate-like cover member (lid portion) 70a in such a manner as to extend in the longitudinal direction of the module cover 70.

The module cover 70 is attached to the front surface of a container 73 of the air bag device, as shown in FIG. 10. When an inflator 74 is operated so as to inject gas for extending an air bag 79, the module cover 70 is torn open along the first and second tear lines 75, 76, and the air bag 79 extends largely in the cabin.

The first tear line 75 extends in the transverse direction of a vehicle body and the second tear lines 76 extend in the direction (longitudinal or vertical direction of the vehicle body) orthogonal to the transverse direction. In the module cover 70 shown in FIGS. 9 and 10, the tear lines 75, 76 are provided in the shape of H. In contrast, in a module cover 70A shown in FIG. 11, tear lines 77, 78 are formed in the shape of U. In this case, the module cover 70A is torn open as shown in FIG. 12 when the air bag extends.

The thickness of each cover members (lid portions) 70a, 70b of the module covers 70 and 70A is uniform as a whole. Each of the module covers 70 and 70A is formed of a synthetic resin. A reinforcing material such as a mesh may be embedded therein.

As described above, in a conventional air bag device, when the air bag extends, the module cover is first torn open along the first tear line, and the tearing operation propagates to the second tear lines, so that the module cover is largely torn open.

However, since the first tear line and the second tear lines are approximately orthogonal at the intersecting portions, there is a fear that the tearing operation progressing along the first tear line progresses inertially on the module cover in the transverse direction of the vehicle body without changing the course.

OBJECTS AND SUMMARY OF THE INVENTION

Accordingly, it is an object of the present invention to eliminate the above-described problem in the related art and to provide a module cover for an air bag device which ensures the tearing operation progressing along a first tear line to change the course at the intersecting portions of the first and second tear lines and to be rapidly relayed to the second tear lines.

It is another object of the present invention to provide a module cover for an air bag device which can be attached to a retainer with a higher strength.

To achieve these objects, in a first aspect of the present invention, there is provided a module cover for an air bag device comprising: a cover member for covering an air bag fixed to a container; adapter members which are projected from the back surface of the cover member so as to attach the cover member to the container; and tear lines which are provided on the back surface of the cover member so as to tear the cover member open therealong when the air bag extends; wherein the thickness of the adapter members is larger than the thickness of the cover member.

In a module cover for an air bag device provided in a second aspect of the present invention, the tear lines include a first tear line which extends in the transverse direction of a vehicle body, i.e. in the widthwise direction of the module cover, and second tear lines which are continued from the first tear line and which extend in the longitudinal or vertical direction of the vehicle body, i.e. in the lengthwise direction of the cover member at least a part of the adapter members is extended in the longitudinal direction or the vertical direction of the vehicle body; the second tear lines are provided on the inner surface of the cover member inside the adapter members which extend in the longitudinal or the vertical direction of the vehicle body directly along base end portions of the adapter members; and the intersecting portions of the first tear line and the second tear lines are disposed at positions along the base end portions.

In a third aspect of the present invention, there is provided a module cover for an air bag device comprising: a cover member for covering an air bag fixed to a container; adapter members which are projected from the back surface of the cover member so as to attach the cover member to the container; and tear lines which are provided on the back surface of the cover member so as to tear the cover member open therealong when the air bag is inflated; wherein the tear lines include a first tear line which extends in the transverse direction of a vehicle body and second tear lines which are continued from the first tear line and which extend in the longitudinal or vertical direction of the vehicle body; at least one of the adapter members is extended in the longitudinal direction or the vertical direction of the vehicle body; the second tear lines are provided at a short distance away from the adapter members which extend in the longitudinal or the vertical direction of the vehicle body; and the thickness of the cover member at the portion between each of the adapter members which extend in the longitudinal or the vertical direction of the vehicle body and each of the second tear lines is larger than the thickness of the cover member at the portion between the second tear lines.

In a fourth aspect of the present invention, there is provided a module cover for an air bag device comprising: a cover member for covering an air bag fixed to a container; a first tear line which are provided on the back surface of the cover member in such a manner as to extend in the transverse direction of a vehicle body; and second tear lines which continue from the first tear line and which are provided on both side end portions of the cover member in such a manner as to extend in the direction orthogonal to the transverse direction of the vehicle body; wherein the thickness of the cover member at the portions outside of the second tear lines is larger than the thickness of the cover member at the portion between the second tear lines.

In a fifth aspect of the present invention, there is provided a module cover for an air bag device comprising: a cover member for covering an air bag fixed to a container; a first tear line which are provided on the back surface of the cover member in such a manner as to extend in the transverse direction of a vehicle body; second tear lines which continue from the first tear line and which are provided on both side end portions of the cover member in such a manner as to extend in the direction orthogonal to the transverse direction of the vehicle body; and ribs provided along the second tear lines on the outside thereof.

In the module cover for an air bag device provided in the first aspect of the present invention, since the adapter members have a large thickness, the strength with which the module cover is fixed to a retainer is high. Even if the tearing operation along the first tear line progresses beyond the second tear lines, when the tear hits against the adapter members having a large thickness, the adapter members block a further progress of the tearing operation. The force to tear the module cover (force applied to the back surface of the module cover by the air bag on extension) is concentrated on the second tear lines, so that the second tear lines are rapidly torn open.

In the module cover for an air bag device provided in the second and fifth aspects of the present invention, when the tearing operation proceeding along the first tear line reaches the intersecting portions of the first tear line and the second tear lines, the adapter members (second aspect) or the ribs (fifth aspect) block the progress of the tearing operation like a large wall. Since the adapter members have a large thickness, they are not substantially torn. Therefore, a further progress of the tearing operation is blocked by the adapter members and is relayed to the second tear lines. Since the second tear lines extend directly along the base end portions of the adapter members, the tearing operation smoothly progresses as if it were guided by the adapter members.

In the module cover for an air bag device provided in the third and fourth aspects of the present invention, when the tearing operation proceeding along the first tear line reaches the intersecting portions of the first tear line and the second tear lines, since the portions having a large thickness exist in front of the intersecting portions, the tearing operation rapidly changes the course to the second tear lines and progresses along the second tear lines.

The above and other objects, features and advantages of the present invention will become clear from the following description of the preferred embodiments thereof, taken in conjunction with the accompanying drawings.

BRIEF DESCRIPTION OF THE DRAWINGS

FIG. 16 is an enlarged perspective view of the part along the line XVI—XVI in FIG. 15.

DESCRIPTION OF THE PREFERRED EMBODIMENTS

Preferred embodiments of a module cover for an air bag device according to the present invention will be explained hereinunder with reference to the accompanying drawings.

Figure 1:
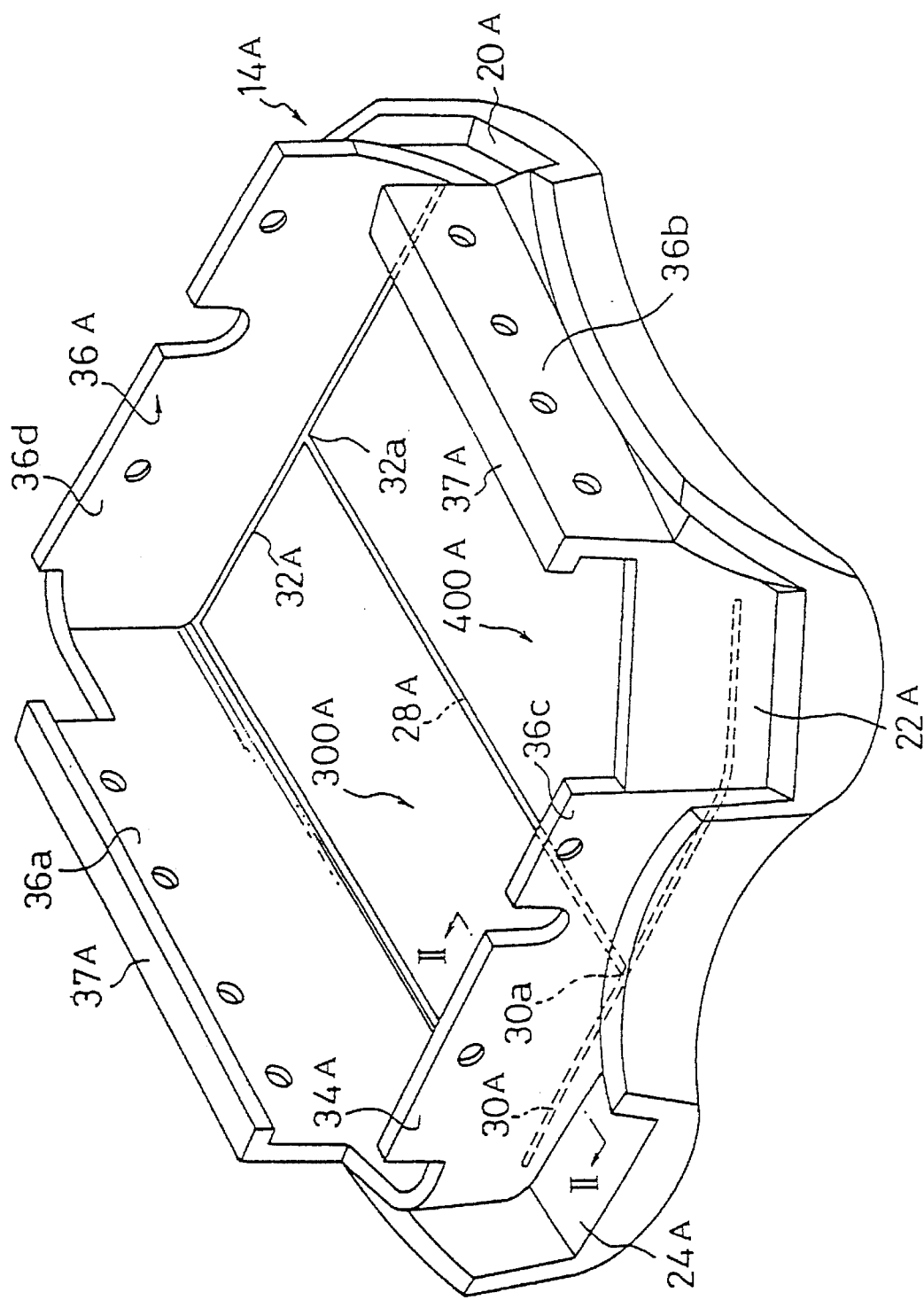
FIG. 1 is a perspective view of an embodiment of a module cover for an air bag device for a driver according to the present invention.
Figure 2:
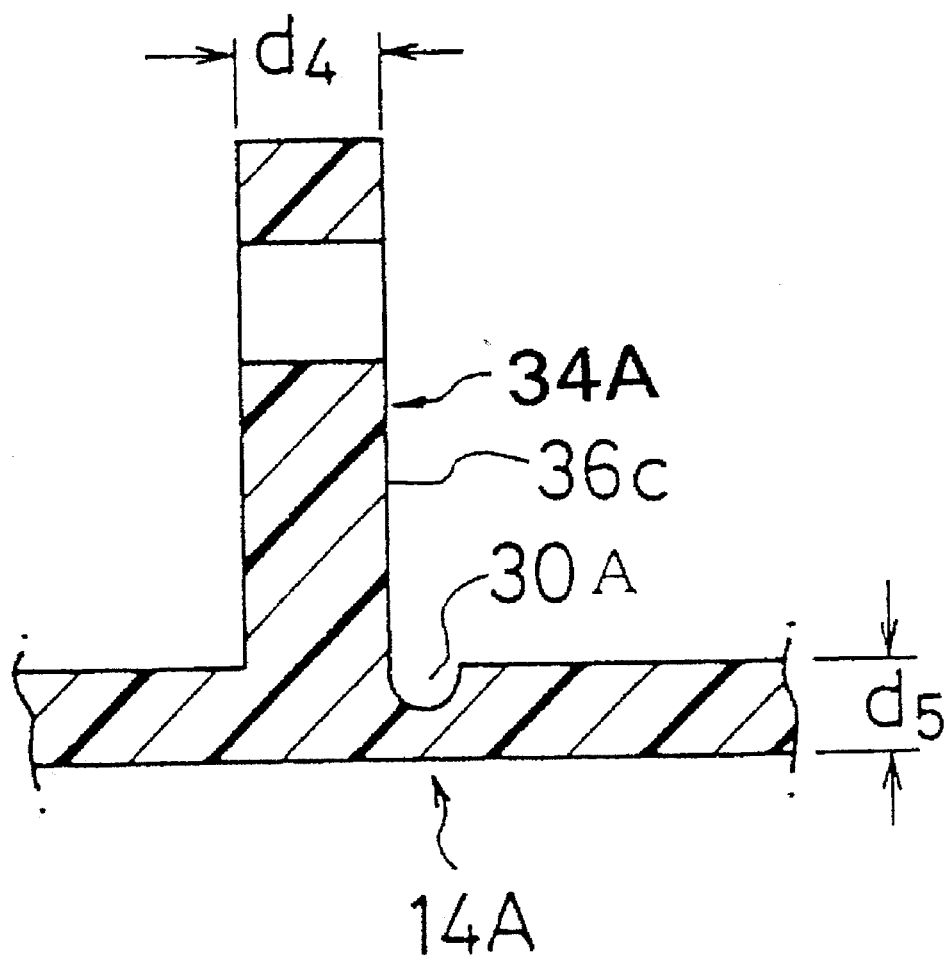
FIG. 2 is a sectional view of the embodiment shown in FIG. 1, taken along the line II—II.

FIG. 1 is a perspective view of a module cover 14A for an air bag device for a driver seen from the back side thereof, and FIG. 2 is a sectional view of the embodiment shown in FIG. 1, taken along the line II—II.

Figure 3:
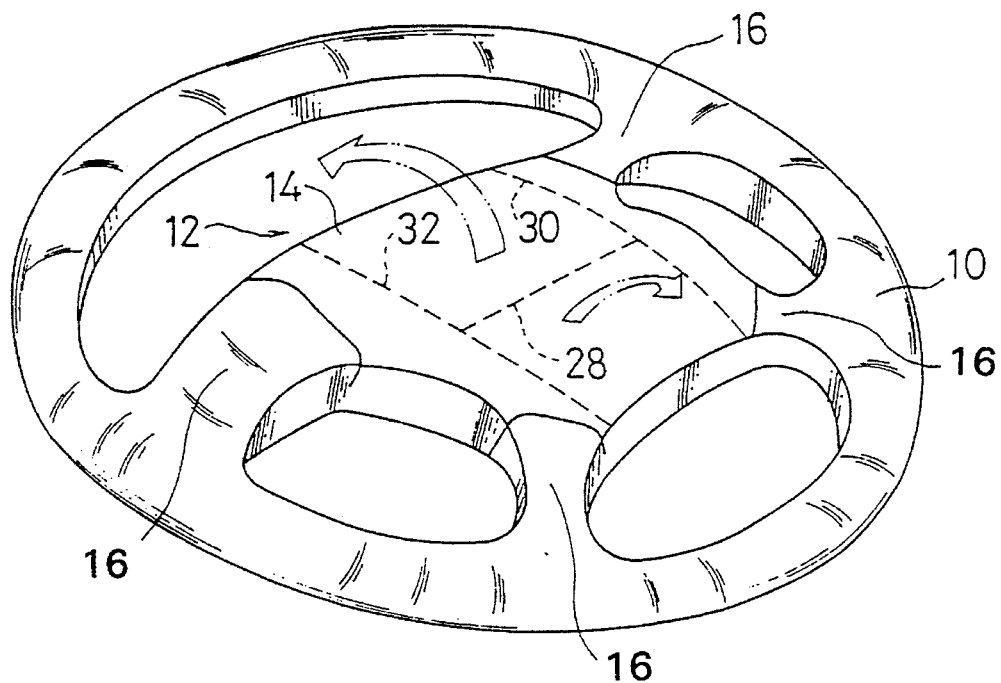
FIG. 3 is a perspective view of a conventional air bag device for a driver.
Figure 4:
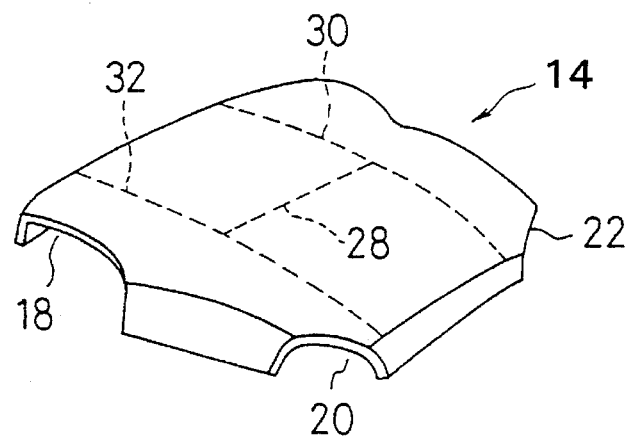
FIG. 4 is a perspective view of a conventional module cover for the air bag device for a driver shown in FIG. 3.
Figure 5:
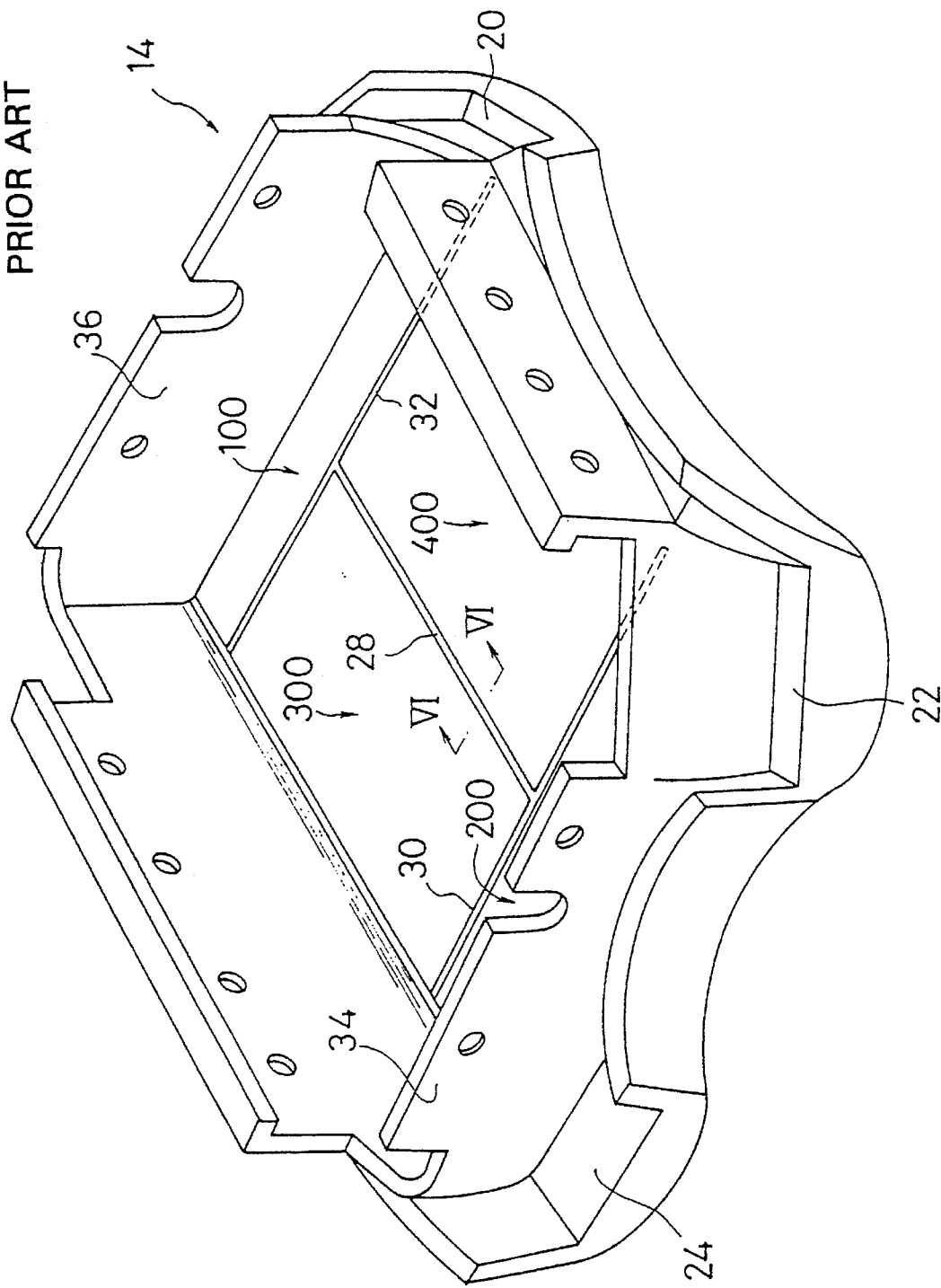
FIG. 5 is a perspective view of the module cover shown in FIG. 4 as seen from the back side thereof.
Figure 6:
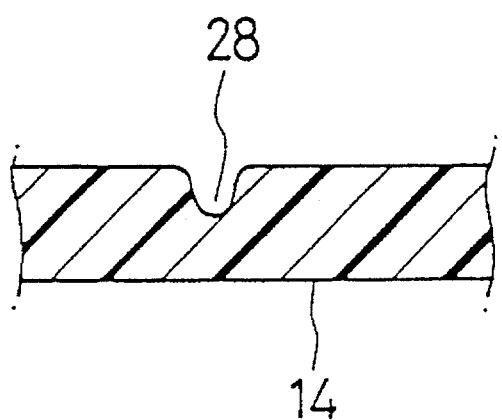
FIG. 6 is a sectional view of the conventional module cover shown in FIG. 5, taken along the line VI—VI.

The module cover 14A is produced by the injection molding of a synthetic resin. In this embodiment, second tear lines 30A, 32A are provided directly along the base end portions of adapter members 34A, 36A. The thickness $d_4$ of the adapter members 34A, 36A is larger than the thickness $d_5$ of the portions 300A, 400A. The other structure is the same as in the conventional air bag device for a driver shown in FIGS. 3 to 5, and the same elements are represented by the same numerals suffixed by A, explanation thereof being omitted.

In this embodiment, when the air bag extends and presses the module cover 14A from the back surface thereof, the first tear line 28A is first torn open and the tearing operation proceeds in the transverse direction of the module cover 14A. When the tearing operation reaches the intersecting portions 30a and 32a of the tear line 28A and the tear lines 30A, 32A, the adapter members 34A, 36A block the progress of the tearing operation like a large wall. In addition, since the adapter members 34A, 36A have a large thickness, the tearing operation in the transverse direction of the module cover 14A is substantially interrupted at these portions. The tearing operation therefore rapidly changes the course at right angles so as to tear the second tear lines 30A, 32A. As a result, the module cover 14A is torn open exactly along the tear lines 28A, 30A and 32A.

Since the adapter members 34A, 36A have a large thickness, the strength and the rigidity thereof are high, so that it is possible to firmly fix the module cover 14A to a retainer (not shown).

Figure 7:
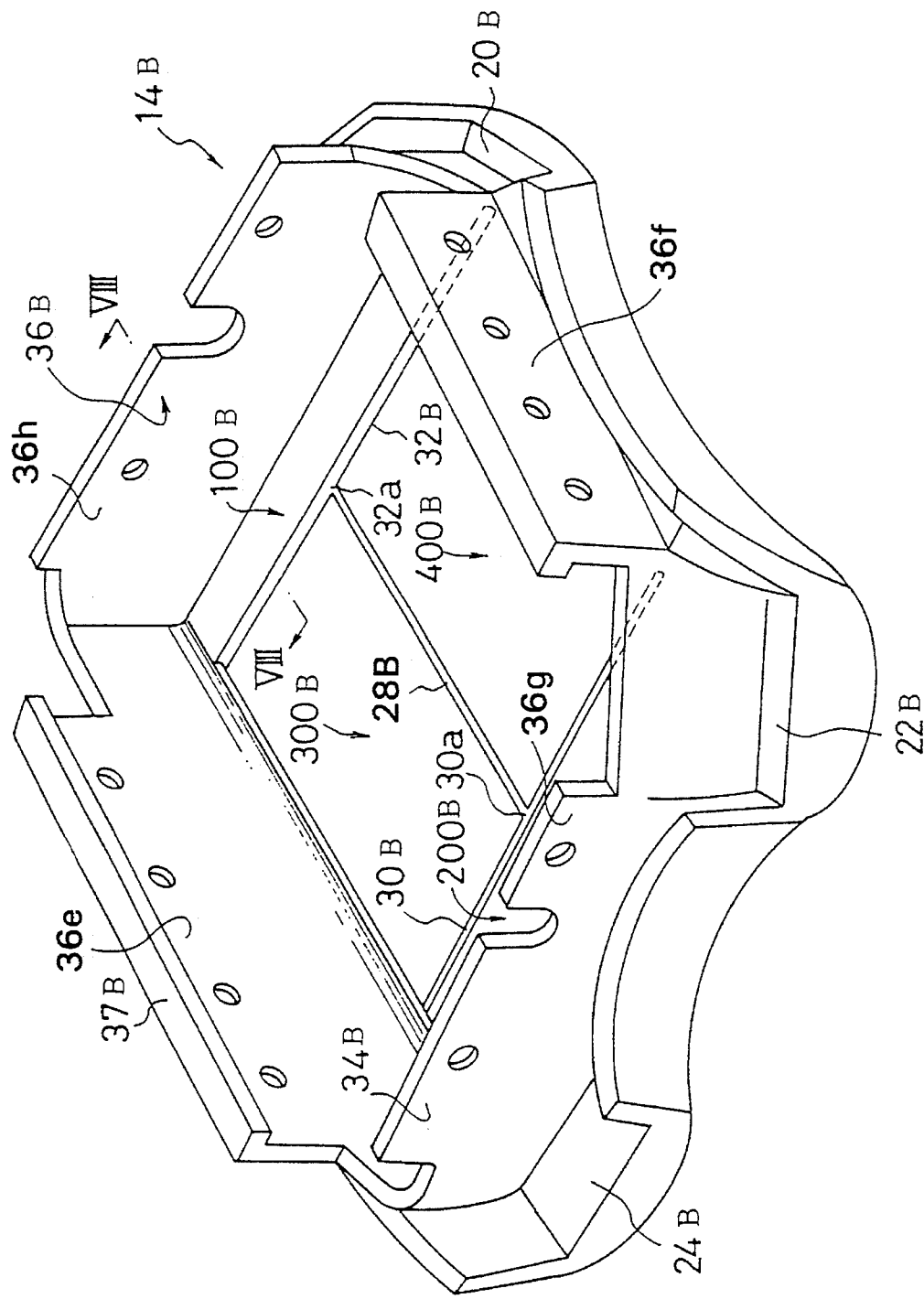
FIG. 7 is a perspective view of another embodiment of a module cover for an air bag device for a driver according to the present invention.
Figure 8:
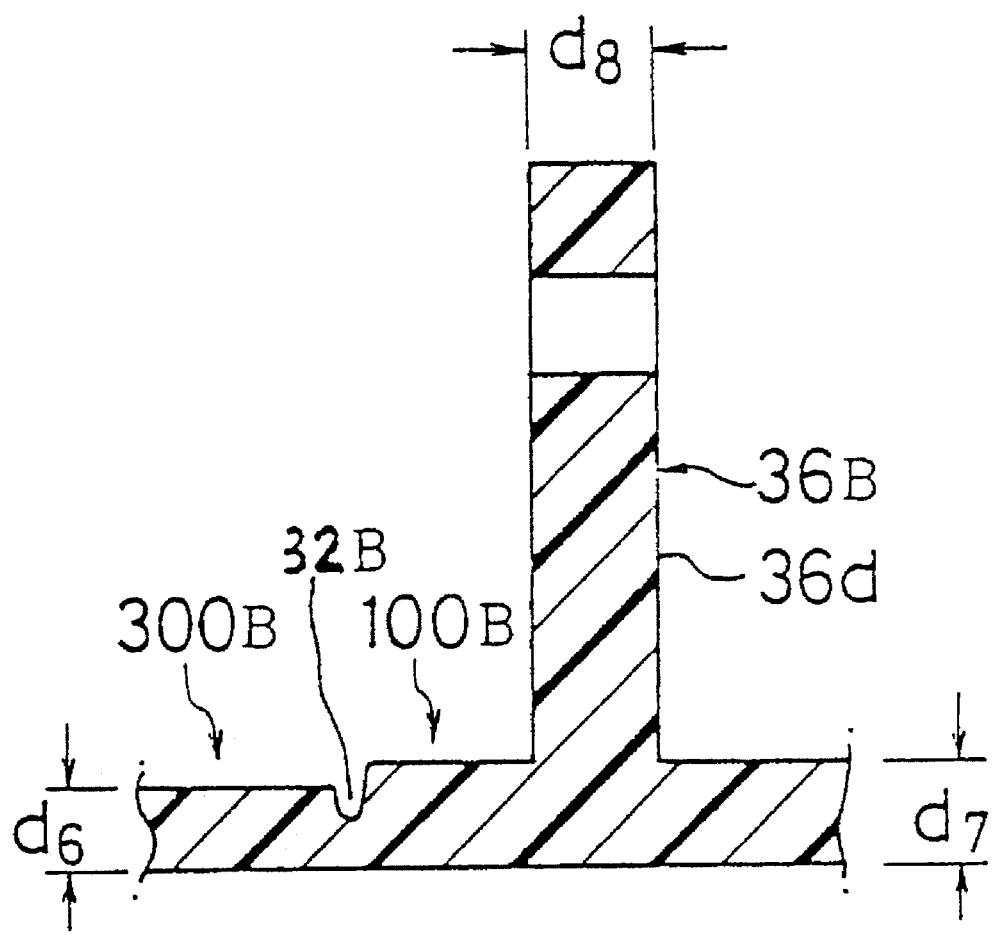
FIG. 8 is a sectional view of the embodiment shown in FIG. 7, taken along the line VIII—VIII.

FIG. 7 is a perspective view of another embodiment of a module cover 14B according to the present invention, and FIG. 8 is a sectional view thereof, taken along the line VIII—VIII in FIG. 7.

In this embodiment, second tear lines 30B, 32B are respectably provided at a short distance away from adapter members 34B, 36B. The thickness $d_7$ of the module cover 14B at the portions (the portion between each of the tear lines 30B and 32B and each of the adapter pieces 34B and 36B) 100B, 200B outside the second tear lines 30B, 32B is larger than the thickness $d_6$ at the portions 300B, 400B between the second tear lines 30B, 32B. The thickness $d_8$ of the adapter members 34B, 36B is larger than the thickness $d_7$ of these portions 100B, 200B. That is, the relationship $d_8 > d_7 > d_6$ holds.

In the module cover 14B having the above-described structure, the tearing operation linearly proceeding along a first tear line 28B toward the intersecting portions 30a, 32a of the first and second tear lines 28B, 30B, 32B cannot linearly proceed beyond the intersecting portions 30a, 32a because the thickness $d_7$ of the portions 100B, 200B is large, and therefore rapidly changes the course at right angles. In this way, the second tear lines 30B, 32B begin to be torn open.

Even if the tearing force proceeding along the first tear line 28B toward the intersecting portions 30a, 32a is so strong that a crack is caused in the portions 100B and 200B, the tearing operation scarcely proceeds from the crack. Even if the tearing operation causes the crack, when it reaches the adapter members 34B, 36B, it stops. This is because that the thickness $d_8$ of the adapter members 34B, 36B is larger than the thickness $d_7$ of these portions 100B, 200B.

As a result of various experiments, it has been found that in the module cover 14A shown in FIGS. 1 and 2, if the thickness $d_4$ of the adapter members 34A, 36A is assumed to be 100%, the thickness $d_5$ of the portions 300A, 400A is preferably 40 to 99%, more preferably 50 to 90%. It has also been found that the thickness of module cover 14A at the deepest portion of the tear lines 28A, 30A and 32A is preferably 10 to 39% more preferably 20 to 30% if $d_4$ is assumed to be 100%.

It has been found that in the module cover 14B shown in FIGS. 7 and 8, if the thickness $d_8$ of the adapter members 34B, 36B is assumed to be 100%, the thickness $d_7$ of the portions 100B, 200B is preferably 70 to 99% and the thickness $d_6$ of the portions 300B, 400B is preferably 40 to 69%. It has also been found that the thickness of the module cover 14B at the deepest portion of the tear lines 28B, 30B and 32B is preferably 10 to 39%, if $d_8$ is assumed to be 100%.

It has been found that when adapter members $36a(36e)$, $36b(36f)$ have retaining portions 37A (37B) respectably, and adapter members $36c(36g)$ and $36d$ $36h$ are used in the module cover 14A (14B) shown in FIG. 1 (7), the thickness of the adapter members $36a(36e)$, $36b(36f)$ is preferably 5 to 20% larger than the thickness of the adapter members $36c(36g)$, $36d(36h)$. This is because when the air bag is extending, a larger force is applied to the adapter members $36a(36e)$, $36b(36f)$ than to the adapter members $36c(36g)$, $36d(36h)$.

Figure 13:
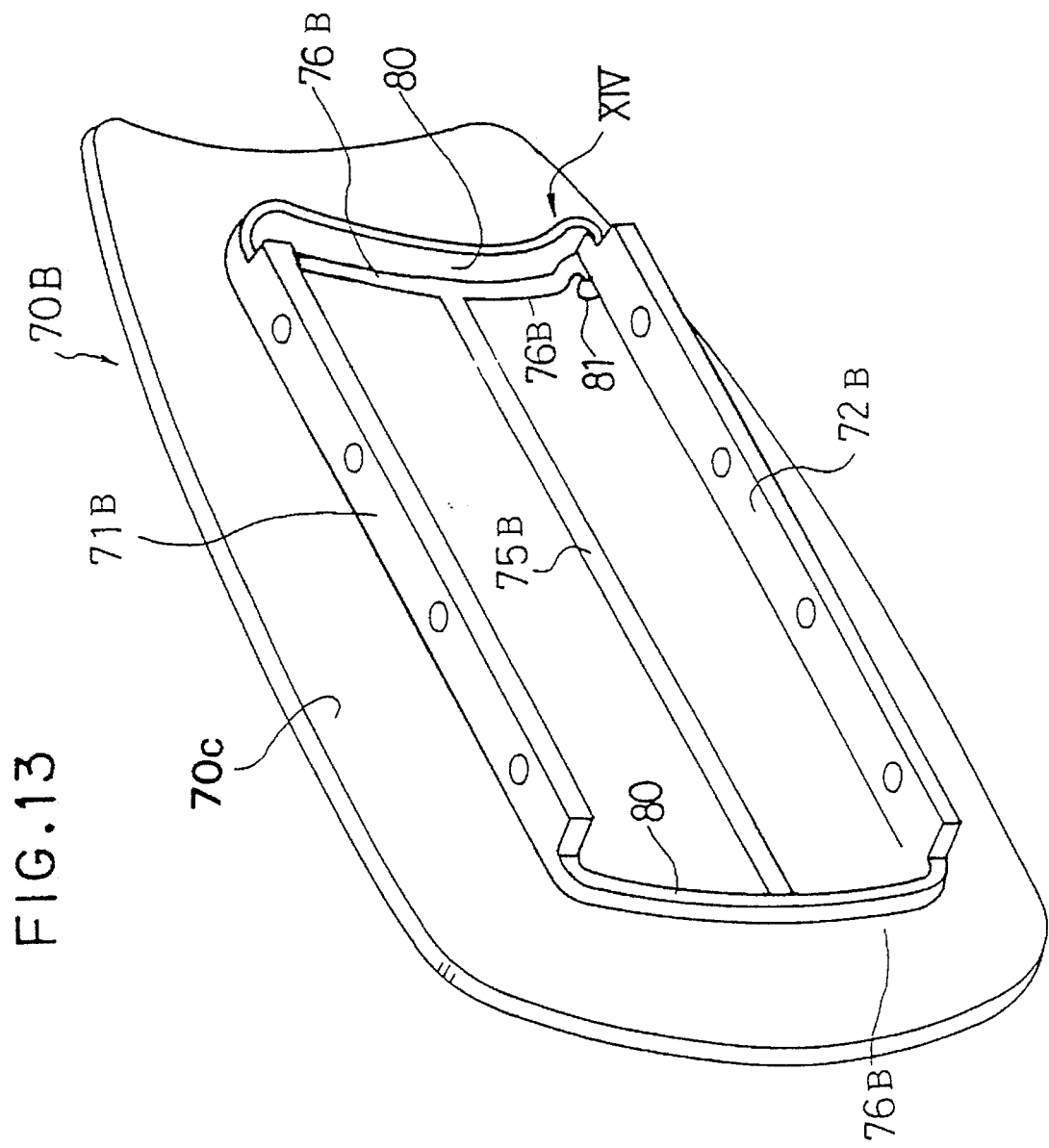
FIG. 13 is a perspective view of still another embodiment of a module cover for an air bag device according to the present invention.
Figure 14:
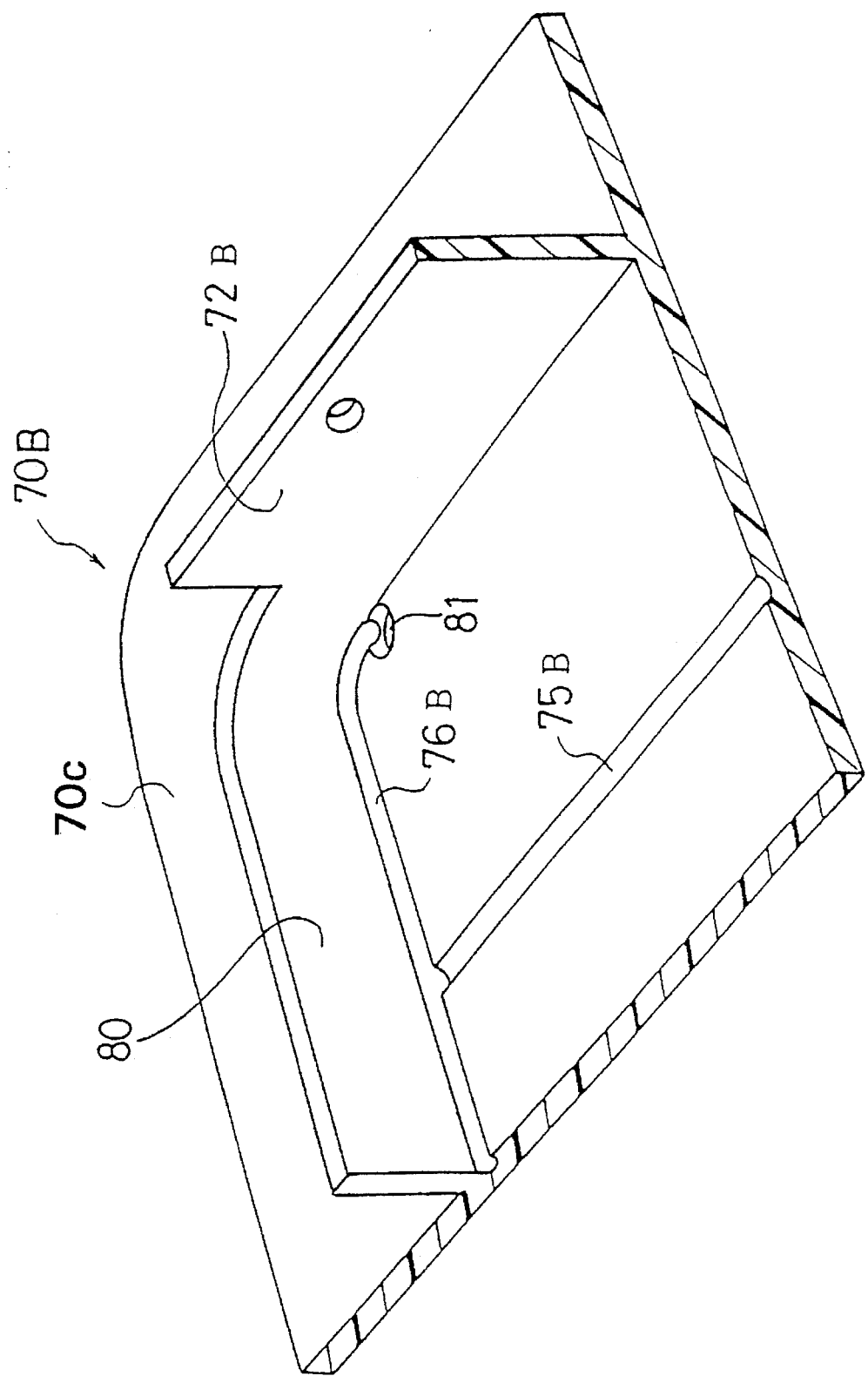
FIG. 14 is an enlarged perspective view of the area shown with "XIV" in FIG. 13.

FIG. 13 is a perspective view of still another embodiment of a module cover for an air bag device according to the present invention. This embodiment is a module cover 70B for a passenger or a rear seat occupant, and FIG. 14 is an enlarged perspective partially sectional view of the portion XIV of the module cover 70B shown in FIG. 13.

The module cover 70B is provided with ribs 80 which extend along the outside of the second tear lines 76B. Stop holes 81 are provided at the end portions of the second tear lines 76B. The stop holes 81 have a function of blocking a further tearing operation of the second tear lines 76B.

The ribs 80 are continued from adapter members 71B, 72B. The ribs 80 are gently curved in the vicinity of the adapter members 71B, 72B, and the tear lines 76B are also curved along the ribs 80.

Figure 9:
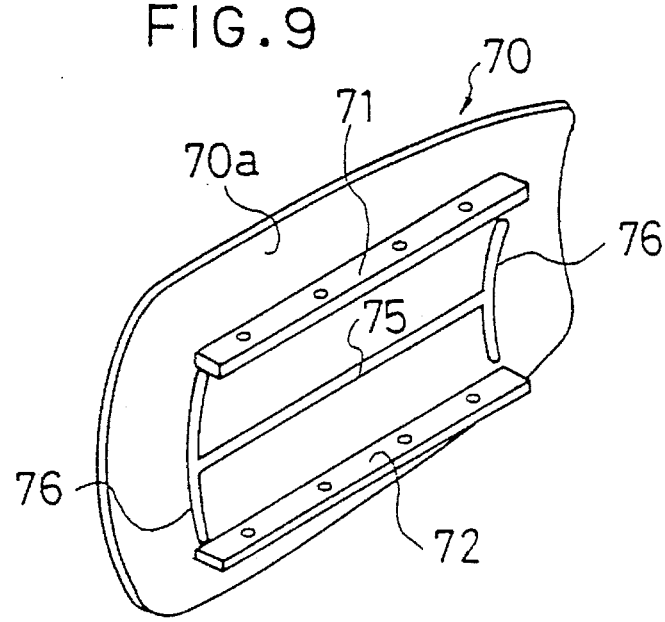
FIG. 9 is a perspective view of a conventional module cover for a passenger or a rear seat occupant air bag device.
Figure 10:
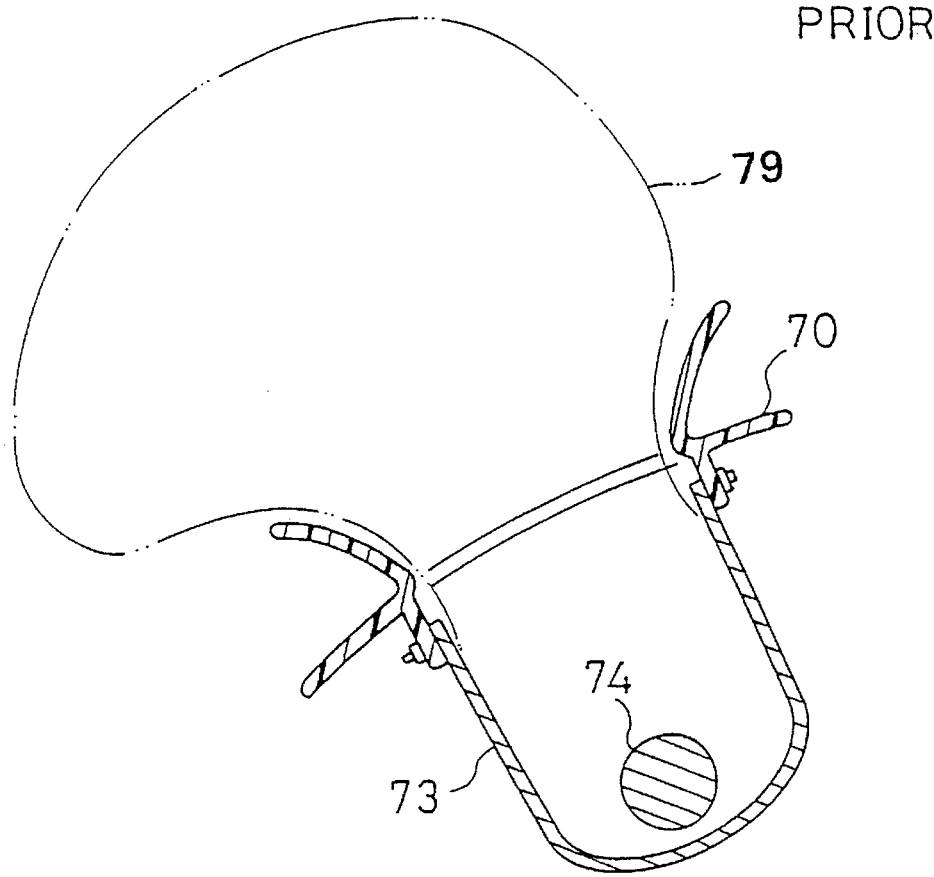
FIG. 10 is a sectional view of the conventional module cover shown in FIG. 9 in a torn-open state.

The other structure is the same as in the module cover 70 shown in FIG. 9, and the same elements are represented by the same numerals suffixed by B.

In the module cover 70B shown in FIGS. 13 and 14, the tearing operation which has proceeded along the first tear line 75B is blocked by the ribs 80 and is rapidly relayed to the second tear lines 76B without proceeding straight beyond the second tear lines 76B.

Figure 15:
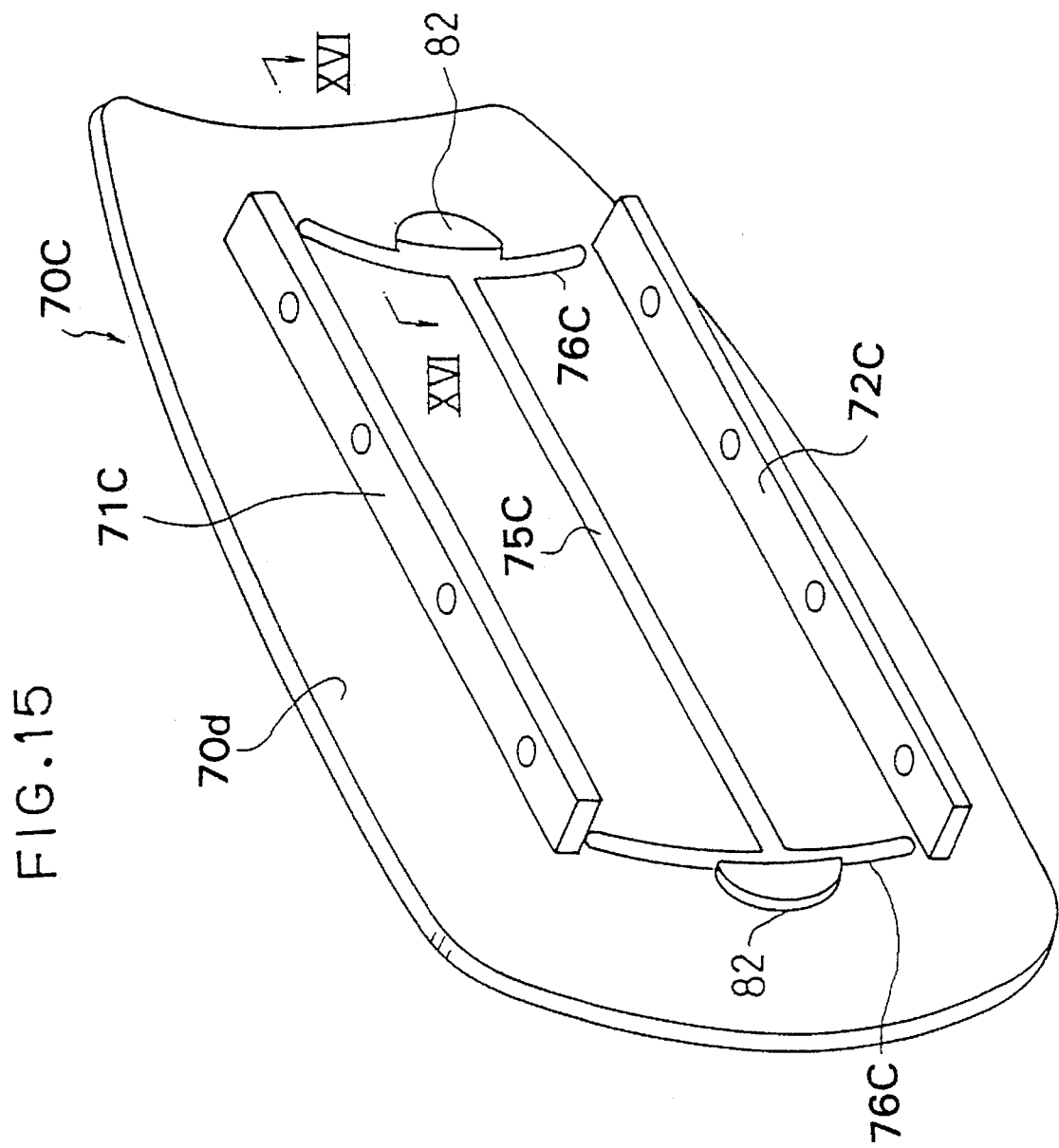
FIG. 15 is a perspective view of a further embodiment of a module cover for an air bag device according to the present invention.

FIGS. 15 and 16 show a further embodiment of a module cover for an air bag device according to the present invention. A module cover 70C is provided with thick-walled portions 82 which are fixed outside second tear lines 76C, and FIG. 16 is a perspective sectional view of the embodiment shown in FIG. 15, taken along the line XVI—XVI.

In this embodiment, the tearing operation which has proceeded along a first tear line 75C is blocked by the thick-walled portions 82 having the thickness which is larger than the thickness of the module cover 70C and is rapidly relayed to the second tear lines 76C.

The other structure is the same as in the module cover 70 shown in FIG. 9, and the same elements are represented by the same numerals suffixed by C. The thick-walled portions 82 may be provided in a wider range than those shown in FIGS. 15 and 16.

Figure 11:
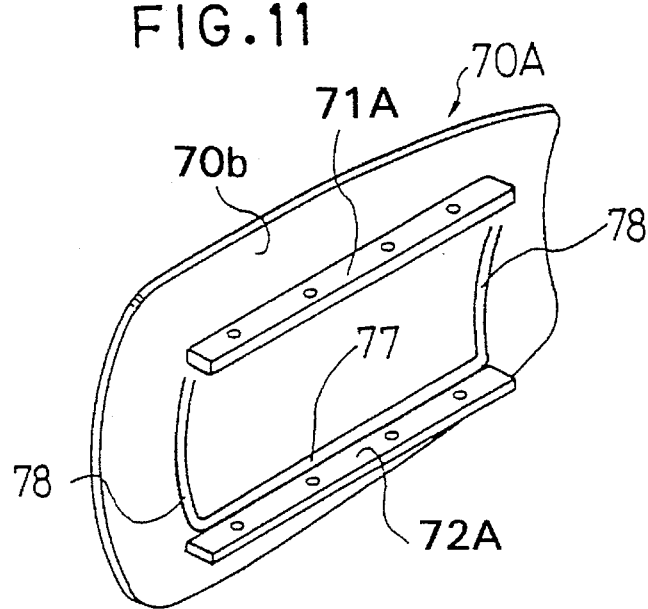
FIG. 11 is a perspective view of another conventional module cover of an air bag device for a passenger or a rear seat occupant.
Figure 12:
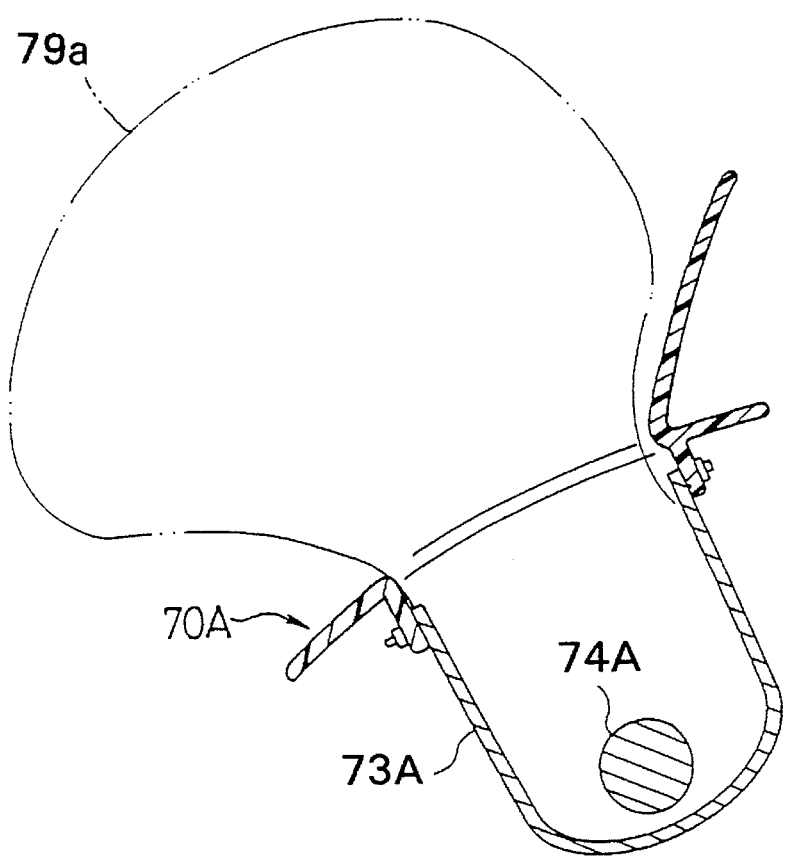
FIG. 12 is a sectional view of the conventional module cover shown in FIG. 11 in a torn-open state.

Although the tear lines are provided in the shape of H in FIGS. 13 to 16, the present invention is also applicable to a module cover having tear lines provided in the shape of U as in FIGS. 11 and 12.

As described above, according to a module cover for an air bag device of the present invention, when the air bag device is operated and the air bag extends, the module cover is torn open exactly along the first tear line and the second tear lines, so that the air bag extends largely in the cabin with rapidity and certainty. In addition, the strength with which the module cover is fixed to the retainer is very high.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A module cover for covering a container with an air bag in an air bag device, comprising:

a cover member having an inner surface and a center portion;

tear lines for tearing the module cover provided on the inner surface of the cover member, said tear lines including a first tear line extending in a transverse direction of the cover member, and second tear lines extending substantially perpendicularly to the first tear line and intersecting at both ends therewith to thereby form intersections, said second tear lines defining therebetween the center portion of the cover member;

first adapter members fixed to the cover member outside the center portion to extend outwardly from the inner surface thereof, said first adapter members connecting the cover member to the container of the air bag device;

side thick-walled portions integrally formed with the cover member and located adjacent to the respective second tear lines outside the center portion, each thick-walled portion facing each intersection and having a thickness larger than a thickness of the center portion and a length parallel to the second tear line adjacent thereto, said length being greater than a width of the first tear line so that a tearing operation started from the first tear line upon inflation of the air bag can continue to the second tear lines at the intersections; and second adapter members fixed to the cover member outside the center portion to be parallel to and spaced away from the second tear lines, each second adapter member having a thickness larger than the thickness of each side thick-walled portion to prevent a tearing operation started from the first tear line from continuing to the second adapter members.

2. A module cover according to claim 1, wherein each side thick-walled portion extends along an entire length of each second tear line.

3. A module cover according to claim 2, wherein a thickness of each first adapter member is larger than a thickness of each second adapter member so that the module cover can be strongly attached to the container.

4. A module cover according to claim 1, wherein the second adapter members are integrally formed with the side thick-walled portions.

* * * * *